United States Patent [19]

Vali et al.

[11] 4,120,587

[45] Oct. 17, 1978

[54] DOUBLE OPTICAL FIBER WAVEGUIDE RING LASER GYROSCOPE

[75] Inventors: Victor Vali; Richard W. Shorthill, both of Salt Lake City, Utah; Raymond Goldstein, Pasadena, Calif.; Reuben S. Krogstad, Seattle, Wash.

[73] Assignee: University of Utah Research Institute, Salt Lake City, Utah

[21] Appl. No.: 634,944

[22] Filed: Nov. 24, 1975

[51] Int. Cl.$^2$ ............................................. G01B 9/02
[52] U.S. Cl. ......................... 356/106 LR; 331/94.5 C
[58] Field of Search ................................. 356/106 LR

[56] References Cited

FOREIGN PATENT DOCUMENTS 1,807,247  3/1970  Fed. Rep. of Germany .... 356/106 LR

OTHER PUBLICATIONS

"Passive Non-Reciprocal ... Ring Laser"; Cirkel et al., Optical Communications; vol. 5, #3; Jun. 1972; pp. 183–186.

Primary Examiner—Vincent P. McGraw

[57] ABSTRACT

A laser gyroscope for determining rotation of an area circumscribed by two closely adjacent optical fiber waveguides which serve as double laser cavities. Laser oscillation is restricted to one direction only in each optical fiber waveguide with the direction of oscillation in each waveguide being opposite to that in the adjacent optical fiber waveguide. Fractional parts of the laser radiation from the laser oscillation in each optical fiber waveguide are superimposed to develop a beat frequency therebetween which is proportional to the angular rotation of the area circumscribed by the two optical fiber waveguides.

12 Claims, 3 Drawing Figures

DOUBLE OPTICAL FIBER WAVEGUIDE RING LASER GYROSCOPE

BACKGROUND

1. Field of the Invention

This invention relates to laser gyroscopes.

2. The Prior Art

The laser gyroscope utilizes the properties of the optical oscillator (laser) and the theory of relativity to produce an integrating rate gyroscope. The laser gyroscope operates on a well-known principle that rotation of an operating ring laser (optical oscillator) about its axis causes the laser oscillation therein to experience an apparent change in path length for each direction. This change in path length causes a frequency shift in the oscillator. As between two counter-directionally travelling laser oscillations, this frequency shift results in the development of a beat frequency. This beat frequency is measured to provide an indication of the rate of angular rotation of the area circumscribed by the conventional ring laser oscillator or laser gyroscope.

The relationship between the observed beat frequency, $\Delta f$, and the rotation rate, $\omega$, is:

$$\Delta f = 4A\omega/\lambda L \qquad (1)$$

where $\lambda$ is the wavelength of the laser radiation, A is the area enclosed or circumscribed by the ring laser and L is the length of the oscillator cavity. The oscillator cavity is defined as the optical path as determined by the optical components of the ring laser system.

The conventional laser gyroscope measures path differences of less than $10^{-6}$ Å, and frequency changes of less than 0.1 Hertz, hereinafter, Hz (a precision of better than one part in $10^{15}$) in order to read rotation rates of less than 0.1° per hour. The conventional laser gyroscope is simply a laser that has three or more reflective surfaces arranged to enclose an area. The three reflective surfaces, together with the light-amplifying material or gain medium in the laser path, forms the optical oscillator (laser). In fact, in the ring laser gyroscope there are two oscillators in the same physical cavity, one that has energy travelling clockwise and one that has energy travelling counter-clockwise. The frequency at which each oscillator operates is determined by the optical path length encountered by the laser radiation in the cavity in which it travels.

Apparent path length differences in the conventional ring laser gyroscope (wherein two oscillator paths are contained in essentially the same laser cavity and which length differences caused by rotation of the single cavity) create a shift in the frequencies in each of the two oscillators. On the other hand, physical changes in cavity length caused by temperature, vibrations, etc., do not cause frequency differences.

In order to sustain oscillation, two conditions must be met: (1) the gain within the oscillator must be equal to unity or greater at some power level set by the amplifying medium, and (2) the number of wave-lengths in the cavity must be an exact integer (that is, the phase shift around the cavity must be zero for each oscillator). If the first condition is to be achieved, the laser frequency must be such that the amplifying medium has sufficient gain to overcome the losses of the reflectors and other elements in the laser path.

In addition to the oscillator conditions of gain and loss, the condition of zero phase shift must also exist. Another way of stating this is that the number of wavelengths in the cavity of the oscillator must be equal to an integer. In the laser oscillator this integer is in the millions and, therefore, a number of frequencies will satisfy these conditions of zero phase shift. However, these frequencies are separated by an amount equal to c/L (the speed of light, c, divided by the total length of the oscillator, L). For a total length of one meter the frequency separation is, therefore, 300 MHz.

Since the wavelength must be an exact integer for the laser radiation path around the cavity, it is this latter condition which actually determines the oscillation frequency of the oscillator. This condition results from the particular frequency (as determined by the path length) being the frequency which excites the gain medium to emit additional laser radiation at the frequency, hence it becomes an oscillator.

When the laser cavity is rotated, the clockwise and counterclockwise paths of the oscillator each have different apparent lengths. The path difference in these two directions causes the two oscillators to operate at different frequencies. The difference in the frequencies is proportional to the rate at which the ring is rotating since the apparent path length difference itself is proportional to the rotation rate. The readout of the laser gyroscope is accomplished by determining the frequency differential or, more particularly, beat frequency, between the two oscillators.

The fundamental condition is that the laser wavelength, $a$, must be equal to an integer of the optical path length for the oscillator around the cavity. This integer is typically in the range of $10^{15}$ to $10^{7}$ (or larger, on certain geophysical applications)

$$L = N\lambda \qquad (2)$$

Accordingly, a change in length, $\Delta L$, will, correspondingly, cause a wavelength change, $\Delta\lambda$, as follows:

$$\Delta\lambda = \Delta L/N \qquad (3)$$

The corresponding frequency change, $\Delta f$, is given as $$\Delta f/f = \Delta L/L \qquad (4)$$

Therefore, given small length differences, $\Delta L$, and reasonable cavity lengths, $L$, the operating frequency for a conventional ring laser gyroscope should be as high as possible.

The relationship between inertial input rates, $\omega$, and apparent length change $\Delta L$ has been given as $$\Delta L = 4A\omega/C \qquad (5)$$

The relationship between $\Delta f$ and $\omega$, in terms of the gryroscope size and length is determined by substituting Equation 4 into Equation 5, giving $$\Delta f = 4A\omega/\lambda L \qquad (6)$$

where $c = \lambda f$.

This concept forms the basis for recent developments in conventional laser gyroscopes wherein the apparent change in the length of the oscillator cavities for the ring laser manifests itself as a shift in the laser frequency and the development of a beat frequency between counter-directionally oscillating wavelengths. Beat frequency is, therefore, measurable to provide an indication of the rate of angular rotation of the oscillator cavity about an axis.

From the foregoing relationship, (Equation 6), it is readily observable that at extremely small angular rotation rates, ω, the beat frequency, Δf, for that particular rotation rate, ω, will also be relatively small.

Some of the limitations of the conventional ring laser gyroscope are phenomena known as "mode pulling" and "lock-in". These phenomena are experienced when the frequency difference between the two oscillators becomes small (less than about 500 Hz). Optical coupling between the two oscillators operating in essentially the same physical cavity pulls the frequencies closer together (mode pulling) and ultimately locks them together (lock-in) into one frequency, thereby eliminating any beat frequency (dead band) at low frequency differences.

When the output of the ring laser oscillator is observed as a function of the rotation rate it is readily seen that the beat frequency is directly proportional to the rotation rate for high rates of rotation. However, as the rotation rate decreases, the beat frequency falls to zero before the rotation rate falls to zero as a result of the foregoing phenomena of "lock-in". The rotation rate at which the observed beat frequency for a conventional ring laser gyroscope falls to zero depends upon the coupling between the two laser oscillation modes and there will always be coupling between oscillators in the same cavity. Obviously, therefore, the "lock-in" between the two frequencies of a single cavity, rotating ring laser oscillator cannot be reduced to zero.

Several techniques have been used to reduce the width of this "dead band" and increase the accuracy of the conventional ring laser gyroscope. These techniques include: (1) biasing the ring laser gyroscope by physically increasing the rate of rotation of the laser gyroscope (with a sinusoidally varying angular velocity, for example) and then subtracting out the induced biasing; or (2) introducing an optical element into the oscillator cavity, the optical element having an index of refraction dependent upon the direction of the laser radiation passing through the element. One of these latter phenomena is known as the Faraday Effect. However, these techniques introduce errors into the system and are also temperature dependent thereby greatly restricting the accuracy of the conventional single cavity ring laser gyroscope.

Alternatively, it has also been proposed to increase the size of the area, A, (see Equation 1) circumscribed by the laser cavity. However, increasing the size of the area circumscribed by the laser cavity has certain limitations as far as practical application of the laser gyroscope is concerned. These limitations include, for example, such factors as: accommodating the large gyroscope size in the vehicle in which it is placed and also temperature fluctuations experienced by the gyroscope's support structure. Other factors are changes caused by local support disturbances such as microseisms, etc. These latter factors are of significance since the laser gyroscope is also useful for the measurement of extremely small rotational rates and rotation rate changes, for example, those experienced in the measure of polar wobble, earth tides, continental drift, and length of day variations. Another factor is where the difference between rotation of a vehicle and the rotating earth become small such as in guidance systems, etc.

A useful discussion of some of the basic theories involved in the laser gyroscope may be found in IEEE SPECTRUM "The Laser Gyro", Joseph Killpatrick, October, pages 44–55 (1967).

In view of the foregoing, what is needed is an improved laser gyroscope in which the mode pulling and lock-in phenomena experienced in conventional laser gyroscopes at low rates of angular rotation does not exist. Such an improvement is disclosed in the present invention.

BRIEF SUMMARY AND OBJECTS OF THE INVENTION

The present invention relates to an improved laser gyroscope apparatus and method wherein two ring laser oscillator cavities are formed as an integral unit and circumscribe an area. The laser oscillation in each cavity is specifically restricted to opposing directions. Mode pulling and lock-in phenomena as between the two counter-directionally travelling laser oscillations is not encountered since there is negligible interaction between the two oscillators. A portion of each counter-directionally travelling laser oscillation is removed and superimposed to develop a beat frequency between the two oscillators. The beat frequency gives an indication of the angular rotation rate of the area circumscribed by the oscillators.

Two optical fiber waveguides are formed or united as an essentially integral unit and each have incorporated therein a gain medium and a nonreciprocal element so as to develop the necessary oscillation and in the appropriate direction.

It is therefore a primary object of this invention to provide improvements in laser gyroscopes.

Another object of this invention is to increase the accuracy of the laser gyroscope at extremely low rates of angular rotation.

An even further object of this invention is to provide at least two optical fiber waveguides for laser cavities.

An even still further object of this invention is to provide a laser gyroscope wherein the laser radiation travels in opposite directions in each of the two optical fiber waveguide laser cavities.

An even still further object of this invention is to provide an improved method for measuring angular rotation of an area.

These and other objects and features of the present invention will become more fully apparent from the following description and appended claims taken in conjunction with the accompanying drawing.

DETAILED DESCRIPTION OF THE PREFERRED EMBODIMENTS

Figure 1:
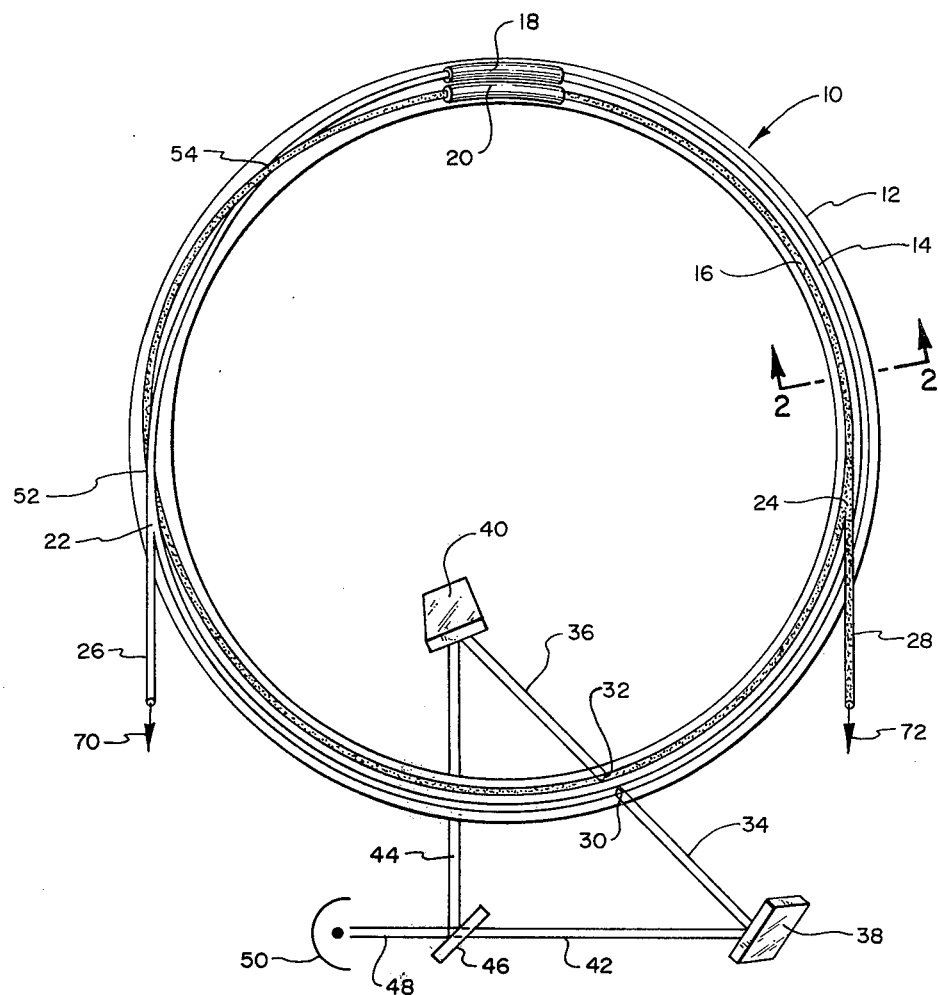
FIG. 1 is a schematic perspective of one presently preferred embodiment of the present invention incorporating a single loop of double core optical fiber waveguide as the two laser cavities for the ring laser gyroscope of this invention.

The invention is best understood by reference to the drawing wherein like parts are designated with like numerals throughout.

GENERAL DISCUSSION

To overcome the foregoing pulling and lock-in effect, and, correspondingly, increase the accuracy of the ring laser gyroscope by orders of magnitude, particularly at low rates of angular rotation, it is herein suggested to incorporate two separate ring laser gyroscopes as an integral unit. Beat frequency is, therefore, obtained between two oppositely travelling oscillator modes in the two distinct ring laser oscillators operating in separate cavities. Accordingly, the effect of pulling at low angular velocities is not encountered because it cannot exist.

To accommodate an optical fiber waveguide as the laser cavity for a ring laser gyroscope or oscillator, a lasing or gain medium is interposed directly in the optical fiber waveguide to form a ring laser oscillator. The optical fiber waveguide is the passive part of the laser oscillator cavity and the gain medium (such as a diode laser, fiber laser, etc.), serves as the active part of the system. A gas laser may also be used as a gain medium except there is a tendency for the lasing action to develop what is commonly referred to as the Fizeau Effect which is the dragging along of photons by a fluid gain medium.

A gain medium such as a neodymium doped fiber, (fiber laser), may be excited according to any suitable conventional technique so as to cause the gain medium to emit energy through the optical fiber waveguide. The emitted radiation traverses the laser cavity created by the optical fiber waveguide and re-enters the gain medium and is there reinforced at the particular frequency (depending upon the path length for the radiation) to thereby become an oscillator. This is the principle of the ring laser.

Pumping the gain medium at a rate such that the gain in one direction is unity or larger while the gain in the other direction is less than unity causes only the gain in the direction where the gain is unity or greater to oscillate. By introducing a nonreciprocal element into the oscillator cavity, the gain in one direction can, thereby, be made to be less than unity. A nonreciprocal element is one where laser radiation in one direction is substantially diverted whereas laser radiation in the opposite direction is essentially uneffected. A nonreciprocal element can be prepared in the form of a Y junction, for example, which is analogous to a Y junction found in microwave waveguide systems. The nonreciprocal element is included in each laser cavity in this present invention but in opposing directions to restrict the laser oscillation therein to a single direction in each laser cavity, the directions being opposite as between the two cavities. The Y junction operates as a nonreciprocal element by permitting the escape of a significant quantity of the laser radiation in one direction thereby causing the gain in that direction to be less than unity and accordingly, there is no laser oscillation in that direction.

The lengths of these two cavities must be almost identical if the gain medium in each is to be excited with the lowest pump power possible. If the two optical fiber waveguide laser cavities are of unequal length, there will be an inherent beat frequency even without rotation.

For example, to obtain a beat frequency between the two cavities negligibly small (for example, less than 10 Hz) the effective length difference between the cavities has to be $$\Delta L < \Delta f L / f \tag{7}$$

where $\Delta f = 10^7$ Hz using a HeNe laser where the frequency is equal to approximately $5 \times 10^{14}$ Hz. Thus, for a ten centimeter radius ring laser, the length, L, is equal to approximately 60 centimeters. Therefore, $$\Delta L < 10^7 / 5 \times 10^{14} \times 60 = 1.2 \times 10^{-6} \text{ cm}. \tag{8}$$

This is equal to 120 A or 1/50 of the wavelength of the HeNe laser. This can be done quite conveniently by fabricating a double core optical fiber waveguide and twisting the double core fiber waveguide at least once while bending it into a circle. It should be noted that the double core optical fiber waveguide can also be twisted $n \times 360°$. Cores 14 and 16 are twisted at least once or 360° as indicated schematically at crossover points 52 and 54 for purposes of illustration only. Uniform twisting of the two cavities is preferable in order to minimize inadvertent length differences between the two laser cavities.

If the ends of the two cavities are polished flat to within $10^{-2}$ of the wavelength of the light used, the equality between the cavity lengths will be preserved within $\lambda/100$.

Referring now more particularly to FIG. 1, the double core fiber optic laser gyroscope is shown generally at 10 and circumscribes an area 360° with a double core optical fiber waveguide 12. Optical fiber waveguide 12 includes a first core 14 and a second core 16, each core having a gain medium 18 and 20 interposed therein, respectively, to form the separate laser cavities of this invention. Core 16 is shown herein as being stippled in order to more clearly set forth the relationship of core 16 to core 14. Each of cores 14 and 16 have a Y junction 22 and 24, respectively, formed therein to selectively restrict the direction of travel of the laser oscillation mode in each core as will be discussed more fully hereinafter. The Y junctions 22 and 24 can be at any suitable location on cores 14 and 16, respectively, and are shown in their present positions for purposes of illustration only.

The ends of cores 14 and 16 may be joined to the respective gain mediums, gain mediums 18 and 20, respectively, or may be joined in a splice in each. Advantageously, each of cores 14 and 16 has an imperfect splice 30 and 32 formed therein, respectively, for the added purpose of deflecting a portion of the laser radiation in each oscillation mode travelling in each of cores 14 and 16. Less than 1% of each mode of laser oscillation is sufficient for the purposes of this invention and does not lower the gain of the oscillator to less than unity.

Imperfect splices 30 and 32 are shown although any other suitable scattering center in each core may be advantageously utilized. These scattering centers could be a slight imperfection in each core or some other device for deflecting a small fraction of the laser oscillation mode from each core.

The deflected laser radiation from each of cores 14 and 16 is indicated herein as radiation beams 34 and 36, respectively. Radiation 34 is deflected as radiation beam 42 by mirror 38. Radiation beam 36 is deflected as beam 44 by mirror 40. Both of beams 42 and 44 are combined by a beam splitter 46 into a combined beam 48.

Beam splitter 46 is configurated as a conventional beam splitter wherein it is prepared as a 50% silvered mirrored surface so as to simultaneously reflect and transmit approximately 50% of each of beams 42 and 44 to form the combined beam 48. The combined beam 48 is directed to a conventional photodetector 50 for the purpose of detecting the beat frequency formed between each of beams 42 and 44 which beat frequency is a function of the angular rotation of ring laser gyroscope 10.

Excitation of gain medium 18 causes laser radiation to be emitted in both directions through core 14. Approximately 50% of the laser radiation emitted counterdirectionally in core 14 passes through leg 26 of junction 22 and escapes from core 14 as indicated by arrow 70. Conversely, the laser radiation emitted clockwise in core 14 does not escape through Y junction 22 but reenters the gain medium 18 and the frequency of the laser radiation, as determined by the apparent path length of the cavity, is amplified by the gain medium, and, therefore, forms an oscillator. Alternatively, the gain medium can be extended for a not insubstantial distance along the length of cores 14 and 16 to provide the unidirectional laser oscillation in each.

The foregoing apparatus creates a ring laser with the laser oscillation mode travelling only in the clockwise direction whereas any residual radiation travelling counterclockwise throughout core 14 has a gain of less than unity and is, therefore, not amplified in the gain medium. Additionally, the fiber laser is pumped at a rate such that the gain in one direction is larger than the gain in the other direction so that oscillation will occur only in the direction in which the gain is greater than unity, presuming, of course, that the gain in the other direction is held less than unity by the nonreciprocal element.

The frequency of oscillation of a ring laser is, therefore, determined by the dimensions of the laser cavity. Accordingly, the laser radiation reentering the gain medium 18 has a specific frequency which is amplified in gain medium 18 at a specific oscillation frequency.

Rotation of the ring laser cavity created between gain medium 18 and core 14 changes the apparent length of the rotating cavity and thereby alters the frequency of the laser oscillations therein. Accordingly, for each rate of rotation of the laser cavity there is a particular frequency obtained.

The foregoing technique for laser fiber 18 and core 14 is also suitably applied to laser fiber 20 and core 16 with the exception that junction 24 now limits the direction of oscillation in core 16 to a counterclockwise travelling mode with the clockwise laser radiation being diverted through leg 28 of junction 24 as indicated by arrow 72. In this manner, two counter-directionally travelling modes of laser radiation in double ring laser may be maintained entirely separate from each other to thereby completely eliminate any pulling between the two modes. This technique permits the precise measurement of extremely low rates of angular rotation of the ring laser gyroscope of this invention without any interference between modes.

Figure 2:
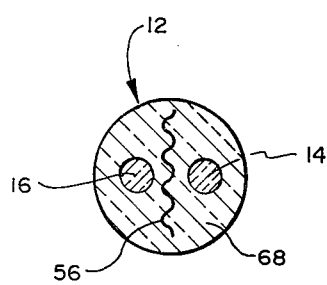
FIG. 2 is a cross section taken along lines 2—2 of FIG. 1.

Referring now more particularly to FIG. 2, each of cores 14 and 16 is fabricated according to conventional techniques as a single mode optical fiber waveguide and each has an index of refraction which is slightly larger than that of the cladding 68 which encompasses both of cores 14 and 16. Cladding 68 serves to (1) closely unite cores 14 and 16 in a parallel relationship, (2) protect cores 14 and 16 from breakage, abrasion and the like, (3) minimize any temperature differential that may exist between cores 14 and 16 and (4) provide a smaller index of refraction from cores 14 and 16 so as to assist in the formation of a light pipe through each of cores 14 and 16. For example, the cores may have an index of refraction of approximately 1.5 whereas the cladding 68 may have an index of refraction of approximately 1.48 or even that of air to thereby provide sufficient differential between the two indices of refraction for the purposes of this invention.

The double cores of optical fiber waveguide 12, cores 14 and 16, are shown in cross section with a barrier 56 interposed therebetween. Barrier 56 may be an absorptive glass having absorptive characteristics different of cladding material 68 to prevent the accidental migration of laser radiation in either of cores 14 or 16 into the opposite core. This is of significance since photons travelling in one direction in a ring laser gyroscope can backscatter and induce photons travelling in the reverse direction thereby interfering with the accuracy of the laser gyroscope.

The double core optical fiber waveguide 12 may be prepared by conventional techniques as is done with a single core optical fiber waveguide.

Figure 3:
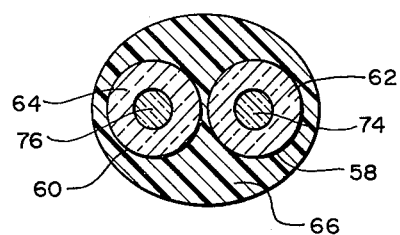
FIG. 3 is a second preferred embodiment for the optical fiber waveguides of FIG. 2.

If desired, two single core optical fiber waveguides may be selectively combined in a matrix which maintains the parallel relationship between the two. For example, referring particularly to FIG. 3, optical fiber waveguides 58 and 60 are suitably embedded in a matrix 66. Matrix 66 is chosen such that it prevents photons from travelling between waveguides 58 and 60 and also has a high degree of thermal conductivity to substantially minimize any thermal gradient between optical waveguides 58 and 60.

Fiber optical waveguide 58 includes a core 74 surrounded by a cladding 62 and is comparable to core 14 and cladding 68 (FIG. 2). Optical fiber waveguide 60 includes a core 76 surrounded by a cladding 64 and is functionally similar to core 16 and surrounding cladding 68 (FIG. 2). Accordingly, each of optical fiber waveguides 58 and 60 function similarly to cores 14 and 16 of FIG. 2 with the exception that the embodiment of FIG. 3 incorporates two single core optical fiber waveguides 58 and 60 whereas the embodiment of FIG. 2 includes a double core, cores 14 and 16, optical fiber waveguide.

As between either of the foregoing embodiments it is important that the laser cavity created by the cores of the optical fiber waveguides be closely combined in a thermally conductive material so as to effectively minimize any temperature gradient between the two laser cavities. Otherwise, a temperature gradient between the two cavities would change the relative cavity lengths and be erroneously interpreted as a change in the rate of angular rotation of the area circumscribed by both of the laser cavities.

Close tolerances in the length can be readily obtained in a straight length of double core or double optical fiber waveguide. However, looping the optical fiber waveguide 360° introduces possible errors in the length of each of the laser cavities. This change can be effectively eliminated by uniformly twisting the combined laser cavities through 360° or $n \times 360°$. Twisting should be done as uniformly as possible to equalize the two core lengths as much as possible.

In the event there is a "bias" created between the two laser cavities by reason of inadvertent length differences this bias may be selectively compensated for in order to obtain a zero beat frequency at zero rotation rate. On the other hand, the "bias" can be accounted for by calibrating the double ring laser gyroscope of this invention such that a zero rotation rate of the instrument corresponds to a finite beat frequency.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A laser apparatus for determining angular rotation of an area comprising:
    a double core optical fiber waveguide having a first and a second core, the waveguide circumscribing the area 360°;
    a gain medium interposed into each of the first and second cores;
    means for activating each gain medium to induce laser oscillation in each core;
    means in the first core for limiting laser oscillation in a clockwise direction and means in the second core for limiting laser oscillation in a counterclockwise direction;
    means for removing a portion of the laser oscillation radiation from each core;
    means for combining the portions of removed laser oscillation radiation, and
    means for detecting frequency differences between the laser oscillations.

2. A laser apparatus as defined in claim 1 wherein the double core optical fiber waveguide includes a light barrier interposed between the two cores.

3. A laser apparatus as defined in claim 1 wherein tha gain medium is selected from the group consisting of a fiber laser, a gas laser, a solid state laser, and a diode laser.

4. A laser apparatus as defined in claim 1 wherein the means for limiting the direction of laser oscillation comprises a junction in the core, the junction selectively diverting the laser radiation in one direction to limit the gain in the said laser radiation to less than unity.

5. A laser apparatus as defined in claim 1 wherein the means for removing a portion of the laser oscillation in each core comprises an imperfection in each core, each imperfection deflecting a portion of the laser oscillation in each core to a reflective surface.

6. A laser apparatus as defined in claim 5 wherein the imperfection is selected from the group consisting of an imperfect splice and a scattering center.

7. A laser apparatus as defined in claim 1 wherein the means for combining the portions of removed laser oscillation comprises a beam splitter.

8. A laser apparatus as defined in claim 1 wherein the means for detecting comprises a photodetector.

9. A laser apparatus comprising:
    first and second optical fiber waveguides joined in essentially parallel relationship, the waveguides circumscribing 360°;
    a gain medium interposed in each waveguide to form each waveguide into a ring laser;
    means in each ring laser for limiting laser oscillation to one direction, the direction of oscillation in the first ring laser being opposite the direction of oscillation in the second;
    means for removing a portion of the ring laser oscillation from each ring laser; and
    means for combining the removed portions and directing the combined portions to a detecting means; and
    means for detecting differences in frequencies in the removed portions of laser oscillation.

10. A method for avoiding the dead band between two modes of counter-directionally travelling laser oscillation in a ring laser gyroscope comprising the steps of:
    obtaining two optical fiber waveguide laser cavities of substantially equal lengths;
    forming a limiting means within each optical fiber waveguide to limit laser oscillation to one direction;
    joining the waveguides in close parallel relationship;
    interposing a gain medium in each waveguide;
    circumscribing an area 360° with the waveguides;
    activating the gain mediums to induce laser oscillation in each optical fiber waveguide, the limiting means in each waveguide selectively restricting oscillation to one direction only, the direction of travel for each oscillation mode being opposite in each laser cavity;
    removing a portion of the laser radiation of each counter-directionally travelling mode of laser oscillation;
    combining the two removed portions; and
    detecting frequency differences between the two portions in the form of a beat frequency, the beat frequency being a function of the angular rotation of the area circumscribed by the waveguides.

11. A method as defined in claim 10 wherein the joining step includes embedding the waveguides in a matrix having a high thermal conductivity to thereby minimize any thermal gradient between the waveguides.

12. A method for limiting laser oscillation to a single direction in each core of a double core optical fiber waveguide ring laser system comprising the steps of:
    circumscribing an area 360° with a laser cavity comprising a double core optical fiber waveguide;
    interposing a gain medium in each core of the double core optical fiber waveguide of the laser cavity;
    forming a nonreciprocal element means in each core of the double core optical fiber waveguide of the laser cavity, the nonreciprocal element in the first core being the reverse of the nonreciprocal element in the second core; and
    exciting the gain medium in each core sufficient to cause the gain to be at least unity in a first direction in the first core, the nonreciprocal element means in the first core causing the gain to be less than unity in the other direction in the first core and the gain to be at least unity in a second direction in the second core, the nonreciprocal element means in the second core causing the gain to be less than unity in the other direction in the second core.

* * * * *